United States Patent
Ciambrone et al.

(10) Patent No.: US 7,438,781 B2
(45) Date of Patent: Oct. 21, 2008

(54) SYSTEM AND METHOD FOR VACUUM BAG FABRICATION

(75) Inventors: David F. Ciambrone, Georgetown, TX (US); Kirk E. Johnson, Diamond Bar, CA (US); Hossien Ahmad, Buena Park, CA (US)

(73) Assignee: Raytheon Company, Waltham, MA (US)

( * ) Notice: Subject to any disclaimer, the term of this patent is extended or adjusted under 35 U.S.C. 154(b) by 518 days.

(21) Appl. No.: 11/000,356

(22) Filed: Nov. 30, 2004

(65) Prior Publication Data

US 2005/0173841 A1    Aug. 11, 2005

Related U.S. Application Data

(62) Division of application No. 10/106,313, filed on Mar. 26, 2002, now abandoned.

(51) Int. Cl.
*B32B 37/10* (2006.01)
(52) U.S. Cl. ............... 156/286; 156/285; 156/382; 264/511; 264/571
(58) Field of Classification Search ........... 156/285, 156/286, 382; 264/511, 571

See application file for complete search history.

(56) References Cited

U.S. PATENT DOCUMENTS

| | | | | |
|---|---|---|---|---|
| 4,016,022 A | * | 4/1977 | Browning et al. | 156/285 |
| 4,816,106 A | * | 3/1989 | Turris et al. | 156/285 |
| 6,827,811 B2 | * | 12/2004 | Andrews et al. | 156/285 |

FOREIGN PATENT DOCUMENTS

JP    EP0186787    * 9/1986    ........... 156/99

* cited by examiner

*Primary Examiner*—Jeff H Aftergut
(74) *Attorney, Agent, or Firm*—Leonard A. Alkov

(57) ABSTRACT

A system and method for vacuum bag assembly fabrication via the vacuum bag method which reduces the amount of trapped air. The inventive system includes a chamber adapted to contain a vacuum bag and first and second evacuating mechanisms. The first evacuating mechanism serves to evacuate the bag and vent to atmosphere. The second evacuating mechanism serves to evacuate and vent the chamber to atmosphere. Thus, generally, the inventive method includes the steps of placing a vacuum bag lay up in an air tight chamber; and evacuating the vacuum bag lay up and the air tight chamber at the same time. In practice, the assembly would consist of at least two components and a heat curable composition. The components can be parts to be bonded together or layers of cloth to be made into a laminate. In this case, the heat curable composition would be a catalyzed adhesive or resin.

11 Claims, 3 Drawing Sheets

SYSTEM AND METHOD FOR VACUUM BAG FABRICATION

CROSS-REFERENCE TO RELATED APPLICATION

This is a Divisional Application of U.S. patent application Ser. No. 10/106,313, filed 03/26/2002 by David F. Ciambrone et al and entitled SYSTEM AND METHOD FOR VACUUM BAG FABRICATION, now abandoned.

STATEMENT REGARDING FEDERALLY SPONSORED R&D

This invention was made with Government support under Contract No. F33657-91-C-0006 awarded by the Department of the Air Force. The U.S. Government has certain rights in this invention.

BACKGROUND OF THE INVENTION:

1. Field of Invention

This invention relates to the field of adhesive bonding and laminating. Specifically, the present invention relates to systems and methods for bonding and laminating using atmospheric pressure, commonly known as vacuum bagging.

2. Description of the Related Art

Vacuum bagging is one of a variety of methods used for the bonding and laminating of manufactured parts. Generally speaking, the part being bonded or laminated is surrounded by an airtight membrane or diaphragm; a vacuum is pulled on that membrane; and the surrounding pressure forces the membrane tightly to the part. Once the part is vacuum bagged it is allowed to cure for a specific period of time depending on its composition. Curing can take place in an oven, autoclave, at room temperature or in a mechanical press.

In adhesive bonding two parts are assembled with a layer of uncured adhesive between them. Typically, a film adhesive is used. The process then applies atmospheric pressure (up to 14.7 psi, depending on altitude). The pressure forces the adhesive layer and the parts into intimate contact thus ensuring good bonds. The vacuum draws out some volatiles and trapped air, resulting in a low void content. Both help to improve resin flow. Vacuum bagging produces strong parts with little air entrapment. The process is adaptable to complex, three-dimensional shapes thus eliminating the need for expensive matched-die molds and presses.

All vacuum bags are constructed in essentially the same way. Before starting a release agent is applied to the tool. This may be a liquid release coating, a wax, or even a solid barrier such as Teflon® tape. When applying the release, the edges of the tool must be masked so the bag sealant tape (BST) will stick to the tool.

BST is a putty-like material, which comes in rolls, usually ½ inch wide, with a release paper on one side. The tape is pressed against the tool, leaving the release paper on until it is time apply the bag. The tape usually goes on after the assembly to be bonded is placed on the tool.

Once the assembly is in place the bag is applied. The first item to go down is a peel ply, which is optional. Peel plies are a tightly woven fabric, often nylon, usually impregnated with some type of release agent. The peel ply may stick to the assembly, but it will pull away without too much difficulty. For adhesive bonding, the peel ply is typically a solid sheet.

After the peel ply comes a layer of release film. This is a thin plastic, which has been treated so it will not bond to the laminate. It is highly stretchable so it can conform to complex geometries.

At least one layer of bleeder cloth goes above the release film. Bleeder is a thick, felt-like cloth. It provides a continuous air path for pulling the vacuum. If the bag wrinkles against the hard assembly, it will trap air. The breather prevents this from happening.

The bag is the last item to be placed. It is a relatively thick plastic layer, available in different amounts of conformability. The bag is usually applied along one edge at a time. One starts at one corner and presses the bag into the BST, removing the release paper from the tape as one moves along the edge. It is important to be careful not to get any wrinkles in the bag or it will leak. Pleats are required for anything but flat or simply curved structures. The bag may be heat sealed instead of using the BST.

Finally, a vacuum port is installed through the bag. The base of the port goes inside the bag. A small cross is cut in the bag for the attachment flange to fit through. If the tool has an area for the port, there must be a breather path from the port to the part. If the port goes on the part itself, several layers of breather are placed under the port to prevent print-through.

While vacuum bagging is a good and inexpensive method of fabricating adhesively bonded assemblies, because of the relatively low pressures employed, a fairly thick bond line results and air can still be trapped in the bond line.

The main aim of adhesive bonding is to produce durable adhesion of one part to another via a layer of adhesive. Ideally, the parts should not be separable from each other for the life of the assembly. However, good adhesion makes rework difficult. If the adhesion is too good, it may not be possible to disassemble the parts even with heating of the adhesive.

Hence, a need remains in the art for 1) a system or method for performing the vacuum bag process which reduces the amount of trapped air and 2) a system or method for providing adequate adhesion while ensuring that the assembly can be easily reworked.

SUMMARY OF THE INVENTION

The present invention is a system and method for vacuum bag assembly fabrication via the vacuum bag method which reduces the amount of trapped air. The inventive system includes a chamber adapted to contain a vacuum bag and first and second evacuating mechanisms. The first evacuating mechanism serves to evacuate the bag and vent to atmosphere. The second evacuating mechanism serves to evacuate and vent the chamber to atmosphere.

In practice, the assembly would consist of at least two components and a heat curable composition. The components can be parts to be bonded together or layers of cloth to be made into a laminate. In this case, the heat curable composition would be a catalyzed adhesive or resin.

Thus, generally, the inventive method includes the steps of placing a vacuum bag lay up in an air tight chamber; and evacuating the vacuum bag lay up; and evacuating the air tight chamber. It is important that the vacuum bag lay up and the air tight chamber be evacuated at the same time.

In a more specific embodiment, the inventive method includes the following steps:

a) making a vacuum bag lay up via standard techniques;
b) placing the vacuum bag lay up in an air tight chamber;
c) evacuating the vacuum bag lay up and the air tight chamber at the same time;
d) maintaining vacuum on the vacuum bag lay up and the air tight chamber for a first short period, preferably around 30 minutes although the range is from 20 to 30 minutes venting the chamber to atmosphere;

e) maintaining vacuum on the vacuum bag lay up for a second short period, preferably around 10 minutes, although the range is from 8 to 12 minutes;

f) moving the vacuum bag lay up to an oven while maintaining vacuum;

g) curing the curable composition;

h) venting the vacuum bag lay up to atmosphere; and i) removing the assembly from the vacuum bag lay up.

Curing may be accomplished by subjecting the curable composition to sufficient heat for a sufficient time to effect a complete cure with optimum interlaminar bond strength. This is the standard method. Adhesive and resin manufacturers always provide the optimum cure schedules for the materials they provide. However, in an improvement on the standard method, which provides for easy reworking of the assembly via producing less than optimum interlaminar bond strength, especially an assembly of bonded components, the temperature is increased at a fast rate to specification cure temperature. The preferred rate is about 8-12° C. per minute. The double vacuum bonding method disclosed herein results in nearly void free bond lines. This enables utilization of adhesive joints with lesser strength adhesives or with thinner bond lines.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
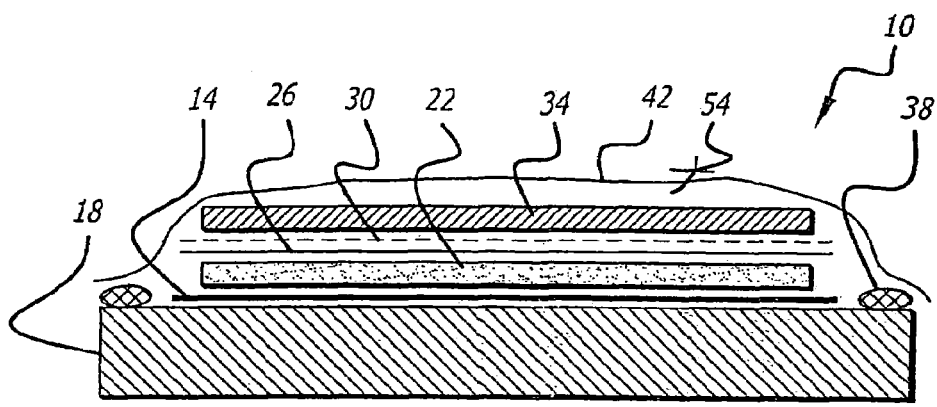
FIG. 1 is a cross sectional diagram of a typical vacuum bag.

FIG. 1 illustrates construction of a typical vacuum bag lay up 10. A layer of release agent 14 is placed on the tool 18. The assembly 22 is placed on top of the release agent 14. On top of that is placed a tear ply 26 (if needed), a release film 30 and a bleeder 34. Sealant 38 is laid around the assembly 22 at the edge of the tool 18. The bag 42 is laid over the entire assembly and finally a vacuum fitting 54 is installed through the bag 42.

Figure 2:
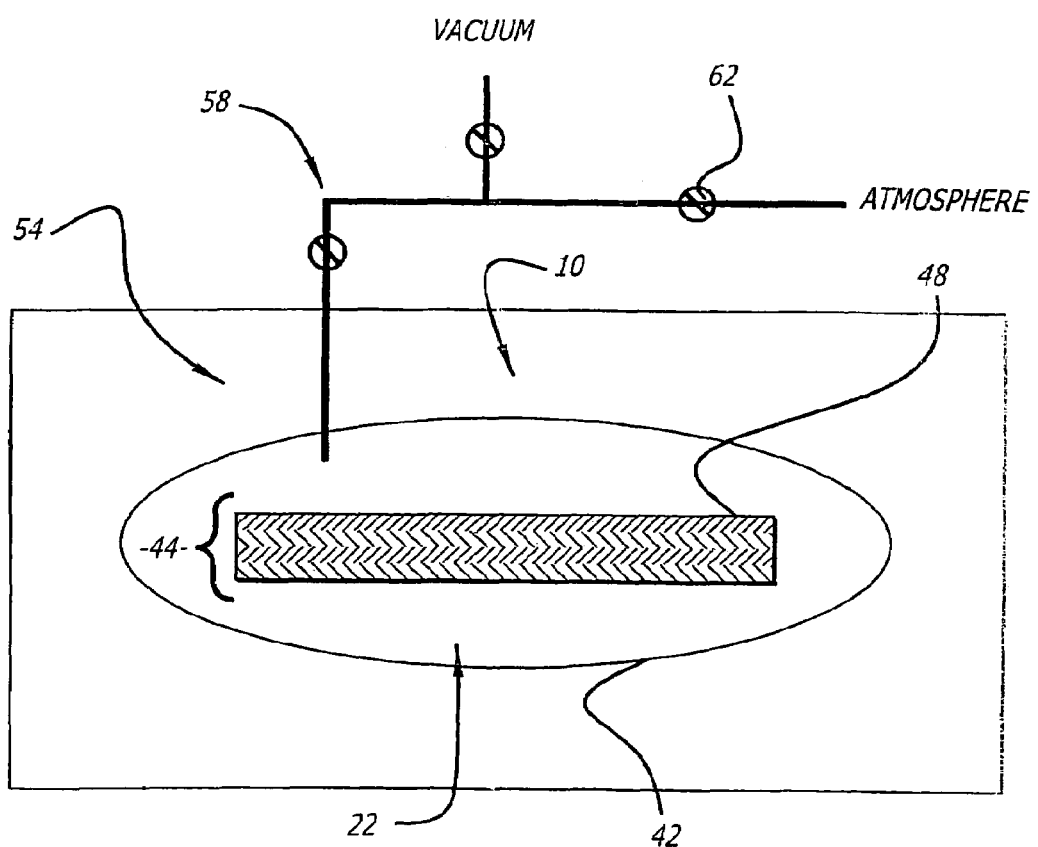
FIG. 2 is a schematic diagram of the use of a typical vacuum bag used in laminating.

The lay up 10 just described is generic. It can be used for lamination of composite materials or adhesive bonding of several parts. Lamination, as illustrated in FIG. 2, is accomplished, for example, with layers of cloth impregnated with a catalyzed resin 48. When the lay up 10 is finished, the bag 42 is evacuated, for example with a vacuum pump, connected to the vacuum fitting 54, and the whole evacuated assembly placed in an oven or similar appliance, where heat may be applied to effect curing of the resin. After curing, the bag 42 is vented to atmosphere and the lay up 10 disassembled. Connection of the bag 42 to vacuum and atmosphere is accomplished by means of an appropriately designed manifold 58 incorporating several valves 62.

Figure 3:
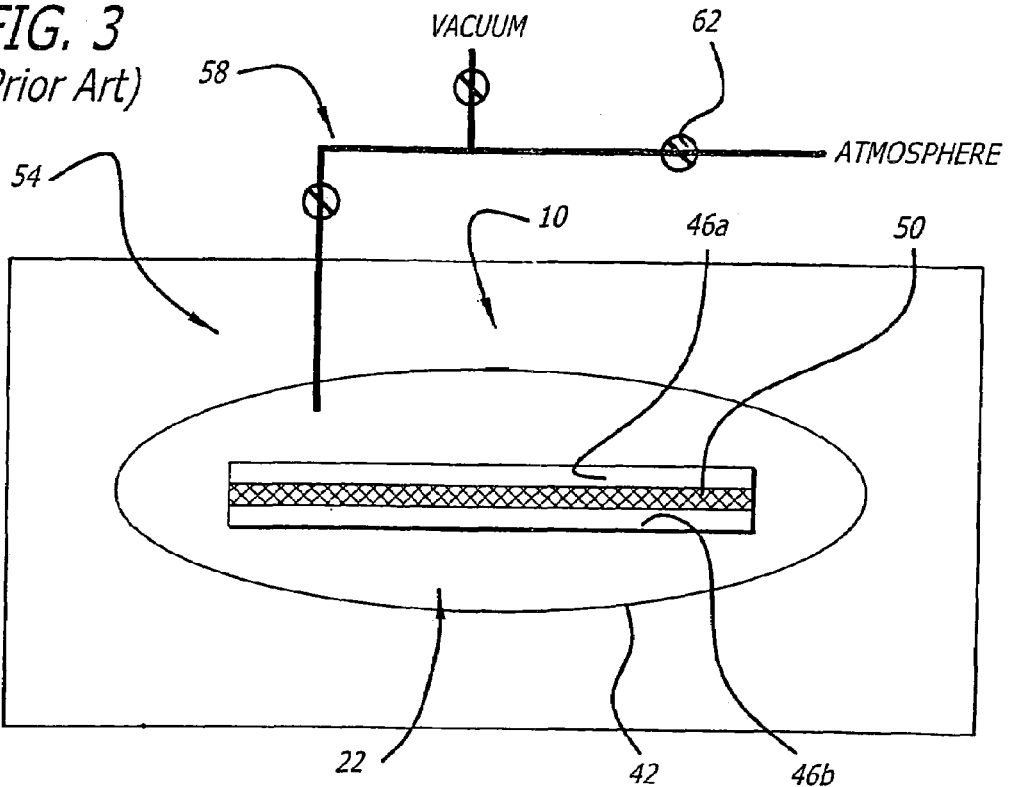
FIG. 3 is a schematic diagram of the use of a typical vacuum bag used in adhesive bonding.

Adhesive bonding, as illustrated in FIG. 3, is accomplished, for example, by appropriately cleaning the parts 46a, 46b and assembling them with a layer of catalyzed adhesive 50 between them. The adhesive 50 is typically supplied as a film. When the lay up 10 is finished, the bag 42 is evacuated, for example with a vacuum pump, connected to the vacuum fitting 54, and the whole evacuated assembly placed in an oven or similar appliance, where heat may be applied to effect curing of the adhesive 50. After curing, the bag 42 is vented to atmosphere and the lay up 10 disassembled. Connection of the bag 42 to vacuum and atmosphere is accomplished by means of an appropriately designed manifold 58 incorporating several valves 62.

Bond lines produced during adhesive bonding using the vacuum bag process are typically 98-100% bond free. Those familiar with the art to which this invention pertains will realize that the above description is merely an outline of the prior art and there are many details that are developed when making use of the vacuum bag process to fabricate any particular assembly 22.

Figure 4:
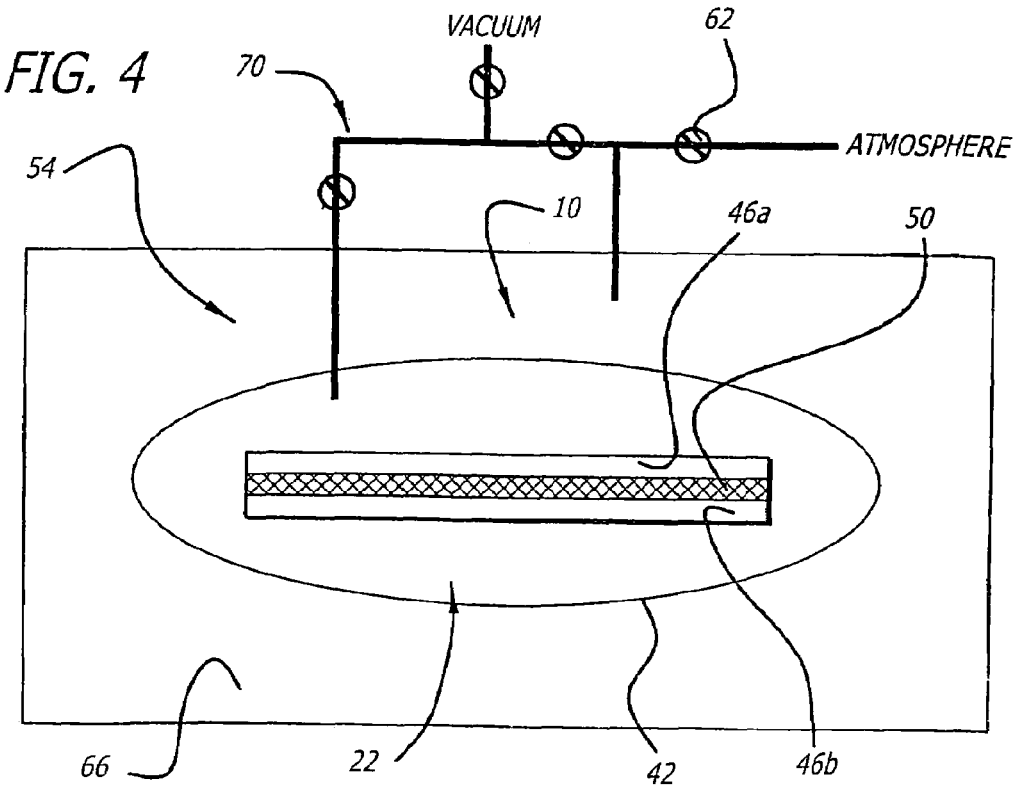
FIG. 4 is a schematic diagram of the apparatus used for double vacuum bonding in accordance with this invention.
Figure 5:
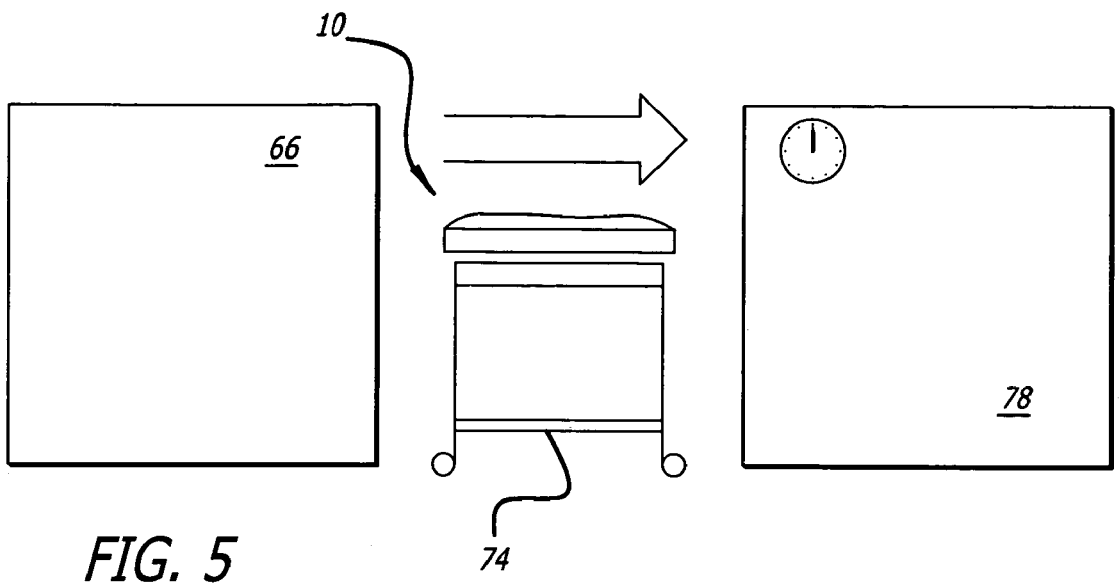
FIG. 5 is a schematic diagram illustrating movement of the vacuum bag lay up from the double vacuum apparatus to the curing oven in accordance with this invention.
Figure 6:
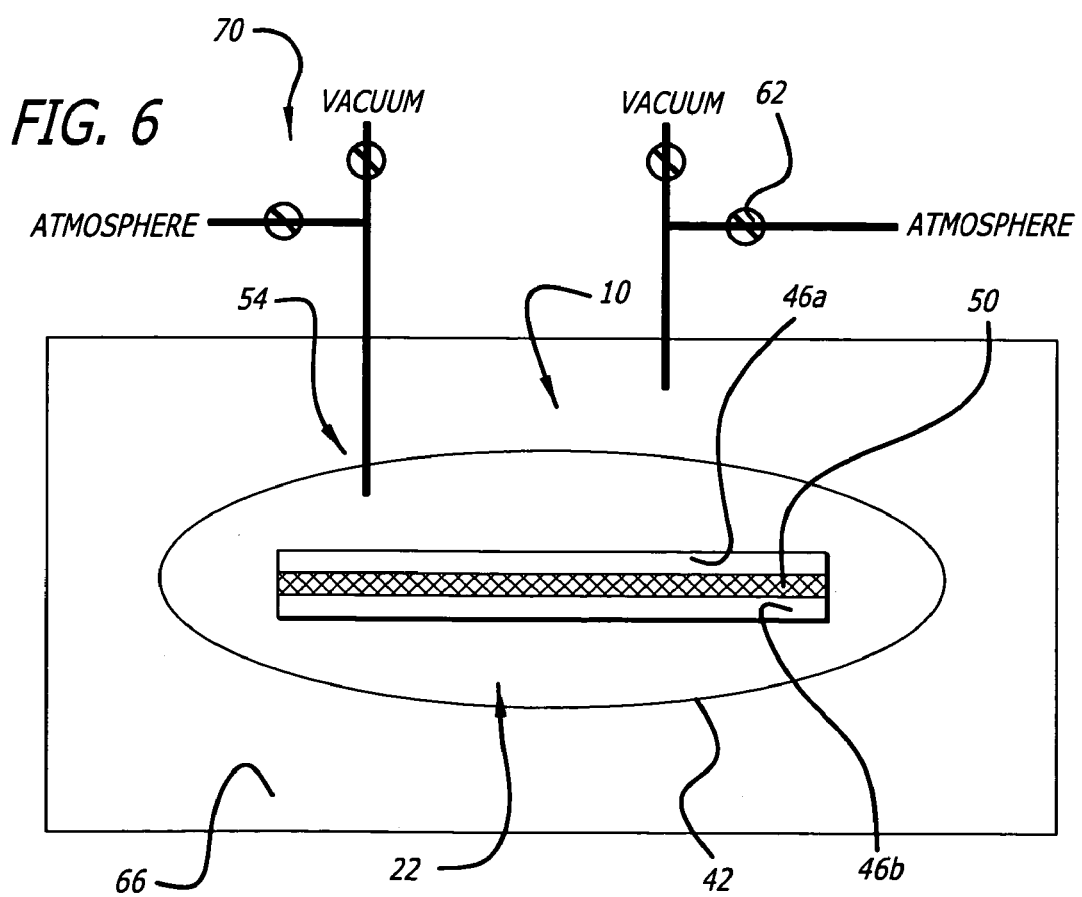
FIG. 6 is a schematic diagram of an alternate evacuation system for double vacuum bonding in accordance with this invention.

FIGS. 4 and 5 illustrate the improvement represented by this invention over the prior art. While FIG. 4 illustrates this improvement applied to adhesive bonding, this improvement is equally applicable to lamination. As in the prior art the parts 46a, 46b are cleaned and assembled with a layer of catalyzed adhesive 50 between them. Then the vacuum bag lay up 10 is made in accordance with the previous descriptions. In this invention, when the vacuum bag lay up 10 is finished it is placed in a chamber 66 which is capable of also being evacuated. Then bag 42 and the chamber 66 are evacuated. Evacuation can be performed simultaneously or the bag 42 can be evacuated first. Vacuum is maintained on both 42, 66 for a time, for example 30 minutes, and then the chamber 66 is brought to atmospheric pressure. This configuration is held for another period, for example 10 minutes, and then the bag 42 and its contents are moved to an oven 78 or similar appliance, where heat may be applied to effect curing of the adhesive 50. Depending on the size and weight of the lay up 10, moving may be accomplished manually or via a wheeled device 74, such as a gurney. The bag 42 may be disconnected from the vacuum pump for the move as long as vacuum is maintained. Those familiar with the vacuum arts will recognize that this is simply accomplished via appropriate valves and quick disconnects. After curing of the adhesive 50, the bag 42 is vented to atmosphere and the lay up 10 disassembled. Connection of the bag 42 and chamber 66 to vacuum and atmosphere is accomplished by means of an appropriately designed manifold 70 incorporating several valves 62. Although a combined evacuation system 70 is illustrated on FIG. 4, it will be obvious to those most familiar with the art to which this invention pertains, that two evacuation systems, one for the bag 42 and one for the chamber 66, could alternatively be employed. Such an alternate evacuation system is illustrated in FIG. 6. Bond lines produced by the improved process of this invention are typically 98% void free.

Another aspect of this invention is the ability to produce a bond that is amenable to reworking. Normally, heating to a specific temperature for a specific time cures adhesives. For example, the manufacturer's recommendation for curing Arlon ThermalBond NP, a silicone adhesive manufactured by Arlon, Inc., Bear, DE, is 5-10 minutes at 100-150° C. When cured at this cure schedule, the adhesive typically develops a lap shear strength of 200-300 psi. In the improvement of this invention, the adhesive is raised to a specific temperature at a specific ramp rate and then held at that temperature for a specific time. It has been found that, with Arlon ThermalBond NP, raising the bond line temperature from room temperature to 100-125° C. at a rate of 7- 12° C. per minute and maintaining temperature for 10-20 minutes produces lap shear strengths in the range of 130-185 psi. A programmable oven 78 is required for this aspect of the invention. As can be seen, the lap shear strength developed by use of this invention is less than manufacturer's specification. Subsequent testing of this invention with actual parts showed that the parts could be easily disassembled with no damage. In other words, this method yields a process by which parts are easily reworkable.

It is therefore intended by the appended claims to cover any and all such applications, modifications and embodiments within the scope of the present invention.

Accordingly,

What is claimed is:

1. A method of fabricating an assembly of at least two components and a heat curable composition comprising the steps of:
    a) providing a vacuum bag lay up; said lay up including said components and said curable composition;
    b) placing said vacuum bag lay up in an air tight chamber;
    c) evacuating said vacuum bag lay up and said air tight chamber at the same time;
    d) maintaining vacuum on said vacuum bag lay up and said air tight chamber for a first period;
    e) venting said chamber to atmosphere;
    f) maintaining vacuum on said vacuum bag lay up for a second period;
    g) moving said vacuum bag lay up to an oven;
    h) curing said curable composition;
    i) venting said vacuum bag lay up to atmosphere; and
    j) removing said assembly from said vacuum bag lay up.

2. The invention of claim 1 in which said components are fabrics and said heat curable composition is a catalyzed resin.

3. The invention of claim 1 in which said heat curable composition is a catalyzed adhesive.

4. The invention of claim 1 in which said first period is approximately 30 minutes.

5. The invention of claim 1 in which said second period is approximately 10 minutes.

6. The invention of claim 1 in which said step of curing comprises subjecting said curable composition to sufficient heat for a sufficient time to effect complete cure with optimum interlaminar bond strength.

7. The invention of claim 1 in which said step of curing comprises the steps of:
    a. increasing temperature to cure temperature for said curable composition; and
    b. maintaining said cure temperature for a sufficient time to effect complete cure;
    whereby adequate but less than optimum interlaminar bond strength is developed so that, if necessary, said components may be easily reworked.

8. The invention of claim 1 wherein:
    the curing step includes the further steps of
        increasing temperature at a rate of about 7-12° C. per minute from room temperature to about 100-125° C.; and
        maintaining the cure temperature for about 10-20 minutes wherein a resulting lap shear strength of the assembly enables components thereof to be easily disassembled with no damage.

9. The invention of claim 1 wherein:
    the first period is about 20-30 minutes.

10. The invention of claim 1 wherein:
    the second period is about 8-12 minutes.

11. A method of fabricating an assembly of at least two components and a heat curable composition comprising the steps of:
    forming a vacuum bag lay up with the components and the curable composition;
    placing the vacuum bag lay up in an air tight chamber;
    evacuating the vacuum bag lay up;
    evacuating the air tight chamber after evacuating the vacuum bag lay up;
    maintaining vacuum on the vacuum bag lay up and the air tight chamber for about 20-30 minutes;
    venting the chamber to atmosphere;
    maintaining vacuum on the vacuum bag lay up for about 8-12 minutes;
    moving the vacuum bag lay up to an oven;
    curing the curable composition;
    venting the vacuum bag lay up to atmosphere; and
    removing the assembly from the vacuum bag lay up.

* * * * *